H. W. SANFORD.
MINING CAR WHEEL.
APPLICATION FILED APR. 28, 1914.

1,104,549.

Patented July 21, 1914.
2 SHEETS—SHEET 2.

Witnesses:
Jas. E. Hutchinson
F. Wedemeier

Inventor
Hugh W. Sanford,
By Bacon & Milans,
Attorneys

UNITED STATES PATENT OFFICE.

HUGH W. SANFORD, OF KNOXVILLE, TENNESSEE.

MINING-CAR WHEEL.

1,104,549.

Specification of Letters Patent.  Patented July 21, 1914.

Application filed April 28, 1914.  Serial No. 834,973.

*To all whom it may concern:*

Be it known that I, HUGH W. SANFORD, citizen of the United States, residing at Knoxville, in the county of Knox and State of Tennessee, have invented certain new and useful Improvements in Mining-Car Wheels, of which the following is a specification, reference being had therein to the accompanying drawing.

This invention relates to wheels of a character more especially designed for service in connection with mining car constructions, though not limited to such use.

The invention has more particularly to deal with that type of car wheel wherein the wheel hub is loose on the axle, and has a movable bearing in the pedestal box, and in the preferred construction, a pedestal bearing for the axle and wheel hub is provided at the outside of the wheel.

One of the objects of the present invention is the provision of a novel type of wheel and hub, the hub being of a construction to adequately take care of the heavy end thrusts of the car in going around the curves, and to reduce friction, and to also provide an intermediate chamber between the hub and axle for the reception of oil or other lubricant, the ends of the bearing provided by the hub and associated parts largely preventing the oil from readily working out at the ends of the bearing.

Another feature of the invention resides in the provision of an oil reservoir in the wheel proper, such reservoir being in communication with the oil chamber of the novel construction of hub, whereby to adequately lubricate the parts in a novel and efficient manner.

A further improvement embodied in the invention is the provision of a novel construction and arrangement of self-contained roller bearings within the wheel hub, thereby eliminating the necessity of cage bearings or the like for retaining the individual rollers in place.

Further, the invention includes a novel and efficient mining car wheel, simple in construction, cheap to produce, highly flexible in taking curves, strong and durable in use, and easily taken care of.

Still further improvements and novel details in the construction and arrangement of the various parts will be appreciated from the description to follow, which, for a clear understanding of the invention is to be considered in connection with the accompanying drawings, forming a part hereof, and wherein is disclosed, for the purpose of illustration, a convenient and satisfactory embodiment of the invention.

Figure 1:
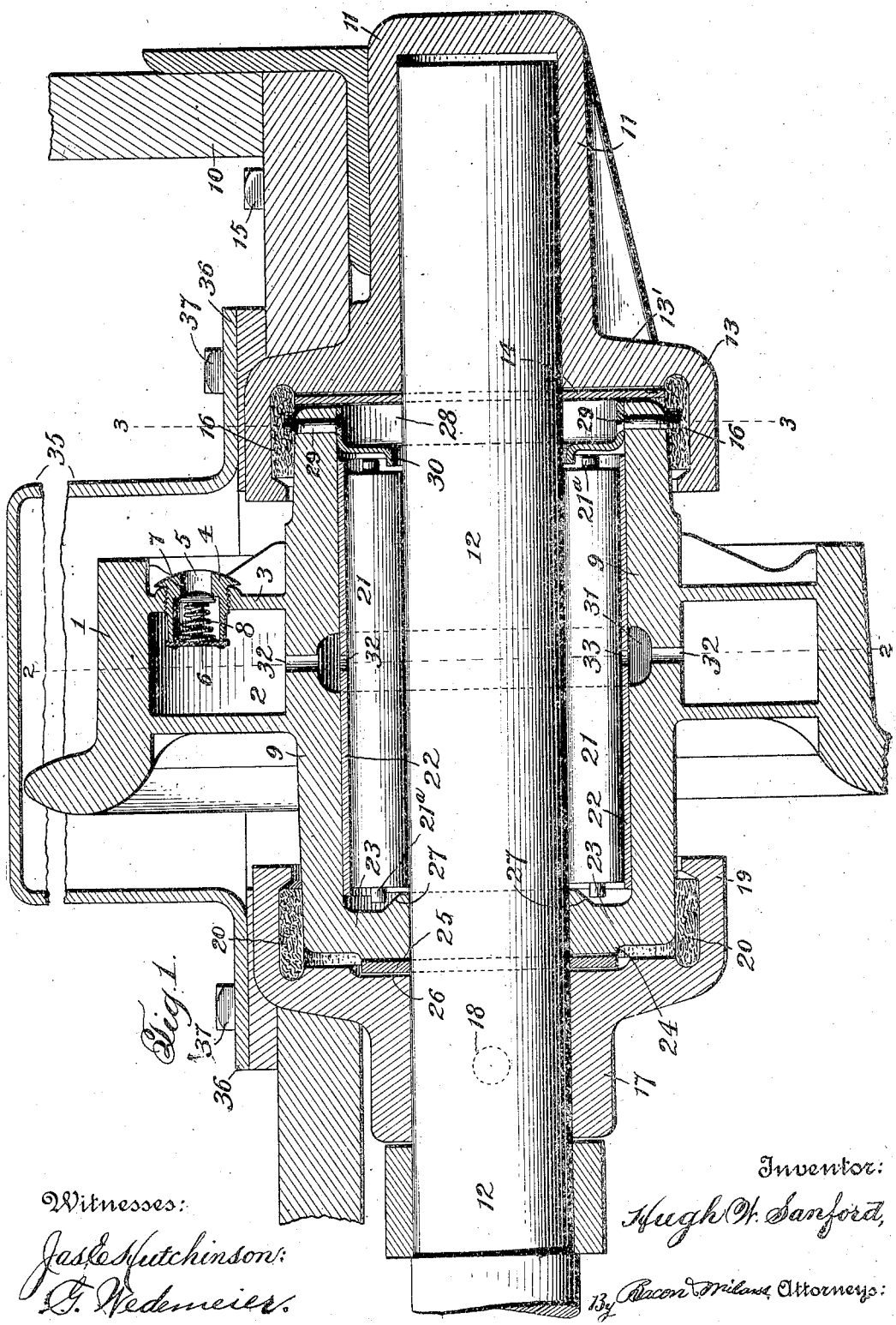
Figure 2:
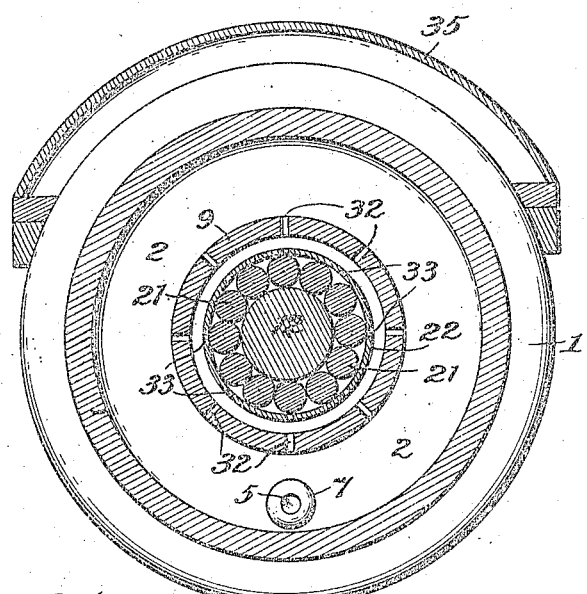
Figure 3:
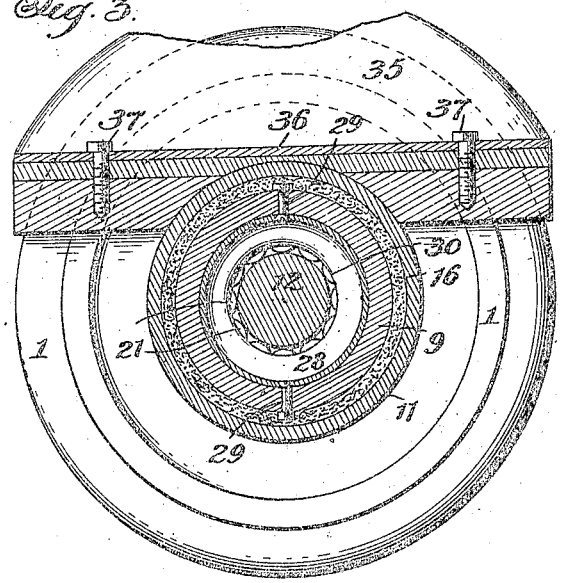

In the drawings:—Figure 1 is a vertical section of the wheel and hub applied to the car frame; Figs. 2 and 3 are cross sectional views on lines 2—2 and 3—3 of Fig. 1.

With more particular reference to the drawings, wherein like reference numerals refer to corresponding parts throughout the several views, 1 is a wheel having a central annular chamber 2, forming a reservoir for oil or other suitable lubricant, the outside of the wheel having a suitable opening for the insertion of the oil. Threaded to said opening is a suitable nut 4 having an opening 5 therethrough, and positioned at the inner end of the nut is an apertured disk 6.

7 is a valve adapted to seat against a shoulder of the nut 4, whereby to close the passage 5, the said valve being normally held to its seat as by a suitable spring 8, interposed between the valve 7 and the apertured disk 6. The wheel has a suitable hub 9, conveniently integral therewith, and projecting laterally from opposite sides of the wheel.

10 is a section of the car frame arranged at the outside of the wheel and having connected thereto, in any desired manner, a pedestal section 11, adapted to loosely receive the end of the axle 12, the pedestal section having an enlarged inner end 13 adapted to be sleeved upon the outer hub portion of the wheel. Preferably a suitable metallic washer 14 is interposed between the outer end of the hub 9 and the shoulder portion 13' of the pedestal part 13.

The pedestal part 11 is preferably removably held in place, as by bolts, 15, engaging the framework of the car. A suitable packing, as of felt, 16, may be interposed between the outer end of the hub and the enlarged portion of the pedestal member surrounding the same. 17 is what may be called a dust-box, the same being sleeved upon the axle and secured thereto as by a pin 18, said box having an enlarged recessed portion 19 sleeved upon the inner end of the hub 9. A yieldable packing, as of felt, 20, may be interposed between the enlarged portion 19 of the dust box and the periphery of the inner end of the hub. The body portion of the hub is preferably spaced about the periphery of the axle, whereby to provide a chamber for the reception of suitable roller bearings 21, a suitable metallic lining 22 being interposed between the hub 9 and said roller bearings.

The inner end of the hub 9 has an inwardly projecting annular flange 23, forming a substantial closure for the inner end of the chamber formed by the hollow hub, the said flange at the inner end of the hub having a suitable projecting boss or abutment member 24, adapted to contact with a suitable metallic thrust washer 25 engaging a shouldered portion 26, of the dust box 17. The flange 23 has at its inner surface an inclined shoulder 27. A cup shaped washer 28 is positioned within the outer end of the hub and secured thereto as by bolts, 29, said washer forming a substantial closure for the outer end of the hub and having an inwardly projecting annular flange 30. The flange 23, at the inner end of the hub, and the cup shaped washer 28, at the outer end thereof, form end walls for the oil reservoir provided by the hollow hub 9, and also end bearings for the roller bearings 21, which latter have reduced terminals or journals 21ª as shown. The hub 9 has an annular chamber 31 communicating with transverse openings 32 connecting with the oil reservoir of the wheel 1. The chamber 31 also communicates with openings 33, projecting through the metallic lining 22. In this way the oil finds a passage from the oil reservoir of the wheel into the roller bearing chamber and about the axle, a small portion thereof finding an exit at the ends of the hub chamber for lubricating that portion of the axle adjacent the ends of the hub.

If desired, a more or less heavy lubricant may be inserted in the reservoir of the wheel chamber by removing the nut 4. Where a thin lubricant is used, the same may be inserted through the valve closed opening 5, the same finding an outlet through the apertured disk 6 at the inner end of the nut.

A mining car wheel constructed as above is exceedingly strong, while, at the same time simple in construction and very easily taken care of. The wheels are readily oiled through the openings 5, as above described, the oil flowing down through the ports of the hub and lining to the roller bearing chamber, and the valve controlled opening 5 is readily accessible from underneath the pedestal box 13. The provision of the flange 23 at the inner end of the hub and the cup-shaped washer 28 at the outer end thereof makes the roller bearing a self-contained one, so that the wheel may be readily taken off the axle and handled as a solid hub wheel, the bearings being held in place. The wheel is held in place by the pedestal 13, which latter forms a closed end bearing for the axle, and a closed end for the outer end of the hub, which is sleeved in the enlarged portion of the pedestal. Likewise the wheel may be removed from the axle, as desired, by the detachment of the pedestal member 13, which may be accomplished by the removal of the bolts 15, above referred to. The relatively narrow boss 24 being reduced in diameter with respect to the hub 9, reduces the diameter of the friction surface against the boxing 17 so that there will be less wear and incidentally less friction at this point.

Any cage support for the individual rollers is done away with by reason of the peculiar construction of bearings, it being found in practice that the pressure on the rollers is on the bottom roller, the roller bearings falling by gravity to the point of pressure, and because of the peculiar construction of rollers may be quickly and cheaply replaced as independent units.

A suitable housing 35 is preferably provided, the same overlying the upper section of the wheel and having side flanges 36, resting upon and removably secured as by bolts 37, to the car frame.

What I claim is:—

1. In a car construction, the combination of a rotatable axle having an abutment thereon, a wheel sleeved upon the axle having an inner hub portion to contact with said abutment, and the outer end of the axle projecting through the hub, and means for retaining the wheel in place on the axle comprising a pedestal member adapted to be detachably secured to the frame of the car, said pedestal member being sleeved upon the end of the axle and having an enlarged inner end sleeved upon the outer end of the hub of the wheel.

2. In a car construction, the combination of a rotatable axle having an abutment thereon, a wheel sleeved upon the axle having an inner hub portion to contact with said abutment, and the outer end of the axle projecting through the hub, and means for retaining the wheel in place on the axle comprising a pedestal member adapted to be detachably secured to the frame of the car, said pedestal member being sleeved upon the end of the axle and having an enlarged inner end sleeved upon the outer end of the hub of the wheel, and a metallic washer interposed between the outer end of the axle and the reduced portion of the pedestal member.

3. In a car wheel, the combination of a rotatable axle, a wheel having a hub fixed thereto sleeved upon the axle, the body portion of the hub being spaced from the periphery of the axle whereby to form a chamber, means for substantially closing the ends of said chamber, an oil duct leading into said chamber through the hub substantially midway of the ends of the latter, and means for supporting the wheel in place comprising a pedestal member sleeved upon the outer end of the axle and having a portion loosely engaging the outer end of the wheel hub.

4. In a mining car wheel, an axle, a wheel having a hub loosely positioned on the axle, a bearing for the axle outside of the wheel, an oil reservoir in the wheel, the hub of the wheel having an opening therethrough communicating with the oil reservoir and with said axle, longitudinally extending bearing rollers interposed between the hub of the wheel and the axle, the wheel hub having at one end an annular flange forming a housing for one end of the rollers, and a cup washer at the outside end of the hub forming a housing for the opposite end of the rollers.

5. In a car wheel, the combination of a rotatable axle, a wheel having a hub fixed thereto sleeved upon the axle, the body portion of the hub being spaced from the periphery of the axle whereby to form a chamber, elongated roller bearings in said chamber, means for substantially closing the ends of said chamber, an oil duct leading into said chamber through the hub, substantially midway of the ends of the latter, and means for supporting the wheel in place comprising a pedestal member sleeved upon the outer end of the axle and having a portion loosely engaging the outer end of the wheel hub.

6. In a car wheel, the combination of a rotatable axle, a wheel having a hub fixed thereto sleeved upon the axle, the body portion of the hub being spaced from the periphery of the axle whereby to form a chamber, elongated roller bearings in said chamber, means for substantially closing the ends of said chamber, an oil duct leading into said chamber through the hub, substantially midway of the ends of the latter, and means for supporting the wheel in place comprising a pedestal member sleeved upon the outer end of the axle and having a portion loosely engaging the outer end of the wheel hub, said end closure means for the oil chamber forming bearings for the ends of the rollers.

7. In a car wheel, the combination of a rotatable axle, a wheel having a hub loosely sleeved upon the axle, said hub having a reduced diameter for a substantial portion of its length, roller bearings interposed between said reduced portion of the hub and axle, said hub having a portion overlying one end of the roller bearings and forming a bearing therefor, and a collar sleeved upon the axle at the opposite end of the roller bearing and forming a bearing for the latter, and a pedestal bearing for the outer end of the wheel hub.

8. In a car wheel, the combination of a wheel, a hub therefor, roller bearings interposed between the hub and axle, said hub having an integral internal annular end flange sleeved upon the axle and otherwise spaced throughout from the axle, a collar interposed between the opposite end of the hub and said axle, said flange and collar having bearings for the roller ends, and a pedestal support engaging over the outer end of the axle and having a receiving chamber for the outer end of the hub.

9. In a car wheel, the combination of a wheel, a hub therefor, roller bearings interposed between the hub and axle, said hub having an integral internal annular end flange sleeved upon the axle and otherwise spaced throughout from the axle, a collar interposed between the opposite end of the hub and said axle, said flange and collar having bearings for the roller ends, and said wheel having an oil reservoir communicating through the hub with the roller bearing chamber.

10. In a car wheel, the combination of a wheel, a hub therefor, roller bearings interposed between the hub and axle, said hub having an integral internal annular end flange sleeved upon the axle and otherwise spaced throughout from the axle, a collar interposed between the opposite end of the hub and said axle, said flange and collar having bearings for the roller ends, and said wheel having an oil reservoir communicating through the hub with the roller bearing chamber, and a valve controlled inlet opening in the side of the wheel leading to said oil reservoir, said valve means being removable, substantially as and for the purpose described.

11. In a mining car wheel, a wheel, a hub therefor, a dust excluding boxing positioned on the axle and having an enlarged portion sleeved upon the inner end of the wheel hub, a pedestal portion having an enlarged portion sleeved upon the outer end of the wheel hub, roller bearings interposed between the hub and axle, and means at the ends of the hub for substantially closing the chamber formed thereby.

12. In a mining car wheel, a wheel, a hub therefor, a dust excluding boxing positioned on the axle and having an enlarged portion sleeved upon the inner end of the wheel hub, a pedestal portion having an enlarged portion sleeved upon the outer end of the wheel hub, packing interposed between the hub ends and said enlarged parts of the pedestal member and dust excluding boxing, roller bearings interposed between the hub and axle, and means at the ends of the hub for substantially closing the chamber formed thereby.

13. In a mining car wheel, a wheel, a hub therefor, a dust excluding boxing positioned on the axle and having an enlarged portion sleeved upon the inner end of the wheel hub, a pedestal portion having an enlarged portion sleeved upon the outer end of the wheel hub, roller bearings interposed between the hub and axle, and means at the ends of the hub for substantially closing the chamber formed thereby, and metallic washers interposed between the reduced portions of the dust excluding boxing and pedestal member and the end of the hub.

14. In a car wheel, the combination of a rotary axle, a pedestal bearing for the outer end of the axle, having an enlarged inner end, a wheel having an open ended hub sleeved upon the axle with the outer end thereof positioned within the enlarged inner end of the pedestal, a cup-shaped washer interposed between the outer end of the hub and axle, and having a roller bearing flange, an internal flange on the inner end of the hub having a roller bearing flange, roller bearings interposed between the hub and axle, an oil reservoir in the wheel communicating through the hub to the roller bearings, and an oil inlet opening leading to said reservoir through the side of the wheel.

15. In a wheel construction, the combination of a rotatable axle, an abutment member positioned on the axle, a wheel sleeved upon the axle to the outside of said abutment, said wheel having a hub with a relatively narrow annular boss on the inner end thereof forming an abutment to coöperate with the abutment member, roller bearings interposed between the hub and axle, and means for securing the wheel on the axle comprising a removable pedestal member sleeved upon the outer end of the axle and having a loose bearing on the outer end of the hub and forming a closure for the outer end of the hub.

In testimony whereof I hereunto affix my signature in the presence of two witnesses.

HUGH W. SANFORD.

Witnesses:
J. A. ECKEL,
W. B. HENDERSON.

---

Copies of this patent may be obtained for five cents each, by addressing the "Commissioner of Patents, Washington, D. C."